(12) United States Patent
Noguchi et al.

(10) Patent No.: US 6,519,507 B1
(45) Date of Patent: Feb. 11, 2003

(54) METHOD OF TEACHING ROBOT WITH TRAVELING AXIS OFF-LINE

(75) Inventors: Yasuhiko Noguchi, Kitakyushu (JP); Koichi Kuwahara, Kitakyushu (JP); Youichi Kakisaka, Kitakyushu (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 0 days.

(21) Appl. No.: 09/787,100
(22) PCT Filed: Sep. 9, 1999
(86) PCT No.: PCT/JP99/04921
§ 371 (c)(1),
(2), (4) Date: May 1, 2001
(87) PCT Pub. No.: WO00/15395
PCT Pub. Date: Mar. 23, 2000

(30) Foreign Application Priority Data

Sep. 14, 1998 (JP) .......................................... 10-259044

(51) Int. Cl.[7] .............................................. G05B 19/04
(52) U.S. Cl. ...................... 700/264; 700/245; 700/159; 228/182; 228/49.6; 228/6.1; 901/3; 901/7; 901/22; 901/47; 219/80
(58) Field of Search ................................ 700/245, 264, 700/159; 219/80; 228/182, 49.6, 6.1; 901/22, 3, 7, 42

(56) References Cited

U.S. PATENT DOCUMENTS 3,744,032 A * 7/1973 Engelberger et al. ....... 180/211
5,201,145 A * 4/1993 Ibe ................................. 451/5
5,293,024 A * 3/1994 Sugahara et al. ......... 318/568.12
5,499,306 A * 3/1996 Sasaki et al. ................ 382/291
5,518,166 A * 5/1996 Numata et al. .............. 228/182

FOREIGN PATENT DOCUMENTS

JP 59-76791 5/1984
JP 10-244481 9/1998

OTHER PUBLICATIONS

Kawano et al., Automatic TIG welding for raised edges of tank corners on membrane LNG tanks, 2001, Internet, pp. 52–56.*
Fanuc robotics, P200T, 2001, Internet, pp. 1–2.*
Fanuc robotics, M–6iT/M–16iT/M–16iLT, 2001, Internet, pp. 1–2.*
Wu et al., F3 Robot Technical Manual, 2000, Internet, pp. 1–18.*
Breazeal et al., Infant–like social interactions between a robot and a human caregiver, 1998, Internet, p. 1–p. 44.*

* cited by examiner

Primary Examiner—William A. Cuchlinski, Jr.
Assistant Examiner—McDieunel Marc
(74) Attorney, Agent, or Firm—Armstrong, Westerman & Hattori, LLP

(57) ABSTRACT

A method of teaching a robot off-line having a traveling axis, by which the final position and final posture are determined when a robot having a traveling axis stops at an arbitrary position on a traveling axis. The method is able to take an arbitrary posture at the arbitrary position, change from the arbitrary position and arbitrary posture, and move a control point of the robot until it agrees with a movement target point. This position on the traveling axis of the robot is determined so as to minimize the distance between a coordinate origin of the robot a movement target point.

4 Claims, 6 Drawing Sheets

METHOD OF TEACHING ROBOT WITH TRAVELING AXIS OFF-LINE

TECHNICAL FIELD

The present invention relates to a method of teaching a robot with a travelling axis off-line.

BACKGROUND ART

A so-called off-line teaching met hod has been publicly known, in which a numerical model that expresses the dimensions and pro files of a robot and its peripheral apparatuses is constructed in a computer, an image based on the above-described model of the above-described robot and peripheral apparatuses is displayed on the display of the above-described computer, and a operation program of the above-described robot is prepared in the above-described computer.

Many of today's robots have six degrees of freedom (three degrees of movement and three degrees of rotation), and can cause an end effecter attached to the tip end thereof to take an arbitrary posture at an arbitrary position. In order to widen the operation range of such robots, there are cases where a robot is mounted on a travelling carriage that runs on a linear travelling track and can stop at an arbitrary position. Since the travelling carriage is controlled by a controller apparatus of the robot together with the other axes, such a robot is generally called a "robot with a travelling axis".

However, since a prior art robot with a travelling axis has a degree of freedom in the travelling axis in addition to three degrees of freedom and has four degrees of freedom in total, there is a problem in that the degree of freedom is redundant. That is, since there are infinite combinations of the movement quantities of the four degrees of freedom when positioning the tip end of the robot with a travelling axis at an appointed position, the movement quantities of the above-described four degrees of freedom cannot be monistically determined.

In the prior art, when preparing an operation program for a robot with a travelling axis by off-line teaching, such a procedure is repeated, in which an operator inputs the quantity of movement of the travelling axis and moves the robot, and makes sure, through simulation, of whether or not the robot can take an appointed posture at the moved position. That is, the operator confirmed the quantities of movement of the travelling axis by trial and error. Therefore, there was another problem in that the teaching consumes much time. There was still another problem in that the time required for the teaching becomes uneven, depending on the experience and skill of an operator.

SUMMARY OF THE INVENTION

Therefore, it is an object of the invention to provide a method of teaching a robot with a travelling axis off-line, by which the movement quantity of the travelling axis of the robot with a travelling axis can be monistically determined. In order to solve the above-described object, the invention is such that the robot with a travelling axis determines the position of the above-described travelling axis of the above-described robot with a travelling axis, at which the distance between the coordinate origin of the above-described robot with a travelling axis and a movement target point is minimized, to be the final teaching position when a control point of the above-described robot with a travelling axis agrees with the above-described movement target point, which departs from an arbitrary initial position and initial posture. Also, a component of a vector, which is oriented from the above-described control point toward the above-described movement target point, parallel to the above-described travelling axis is obtained when the above-described robot with a travelling axis takes the above-described posture at the above-described initial position, and the position at which the robot has moved by the above-described component of the above-described vector, is determined to be the above-described final teaching position. In addition, a position on the above-described travelling axis, at which the above-described movement target point exceeds the outer edge of an operation range of the control point of the above-described robot with a travelling axis and enters the above-described operation range when the above-described robot with a travelling axis approaches the above-described movement target point from the above-described initial position on the above-described travelling axis, is taken as the first position, and a position on the above-described travelling axis of the above-described robot with a travelling axis, where the distance between the coordinate origin of the above-described robot with a travelling axis and the above-described movement target point is minimized, is taken as the second position, wherein an arbitrary point between the above-described first position and the above-described second position is determined to be the final teaching posit ion of the above-described robot with a travelling axis on the above-described travelling axis. Further, where the above-described movement target point resides outside the operation range of the above-described control point when the above-described robot with a travelling axis is located at the above-described final position, the above-described robot with a travelling axis is repeatedly moved at an appointed pitch from the above-described final position to the above-described initial position until the above-described movement target point enters the operation range of the above-described control point.

BEST MODE FOR CARRYING OUT THE INVENTION

Figure 1:
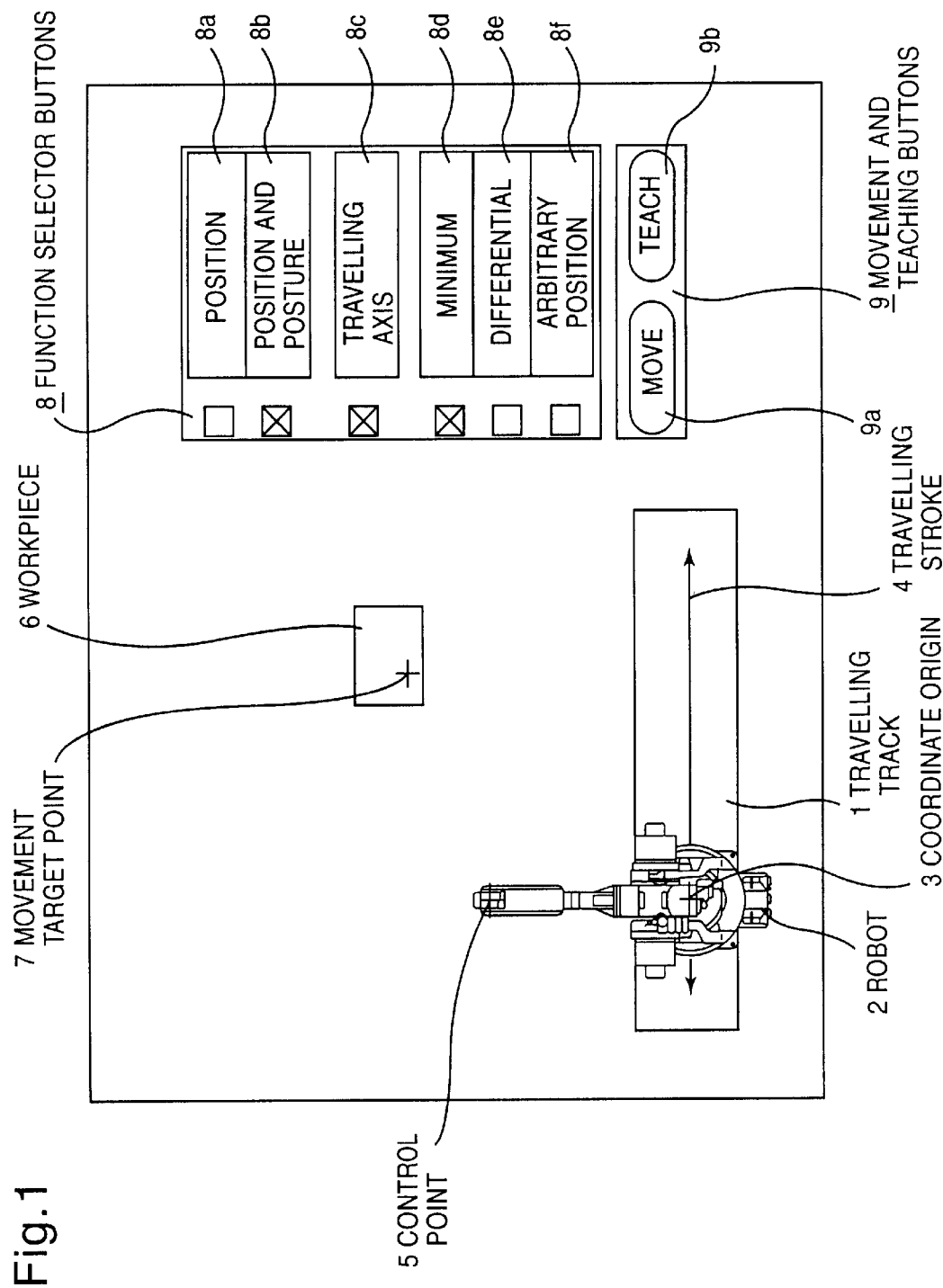
FIG. 1 is a display device of an off-line teaching device according to an embodiment of the invention.

FIG. 1 is a display screen of an off-line teaching apparatus showing an embodiment of the invention. The above-described off-line teaching apparatus is a publicly known personal computer that includes a central processing unit, a memory device, a display, a keyboard, and an input device such as a mouse, and incorporates software provided with the features described below.

In the drawing, 1 denotes a travelling track, 2 denotes a robot, 3 denotes the coordinate origin of the robot 2 and is fixed at the robot 2. The robot 2 can freely travel on the travelling track within a range of a travelling stroke 4. Also, the robot 2 has six degrees of freedom (seven degrees of freedom in total if the above-described travelling is included), three of which pertain to movement, the remaining three of which pertain to rotation. 5 denotes a control point of the robot 2, which is the reference when positioning the tip end of the robot 2. 6 denotes a workpiece that is an objective to be handled by the robot 2. 7 denotes a movement target point on the workpiece 6.

8 denotes function selector buttons that are used to select various types of functions with respect to off-line teaching, wherein 8a is a button for selecting emphasis on position, 8b is a button for selecting emphasis on position and posture, 8c is button for selecting priority is placed on movement of the travelling axis, 8d is button for selecting moving to the minimum distance, 8e is a button for selecting differential movement, and 8f is a button for selecting moving to an arbitrary position. 9 denotes movement and teaching buttons, wherein 9a is a button for selecting movement, and 9b is a button for selecting teaching.

While looking at the display screen described above, an operator inputs the movement of the robot 2 by operating the function selector buttons 8, movement and teaching buttons 9, and key board or mouse (which is not shown), etc. Since the inputted result is displayed on a display as a moving screen or stationary screen, the operator is able to check the inputted results.

Hereinafter, a description is given of a method for teaching movement to position the control point 5 of the robot 2 at a movement target point by using the off-line teaching apparatus.

First, either one of the button 8a or 8b is selected. If the button 8a is selected, the emphasis on position mode is brought about, wherein no consideration is taken of the posture of the robot 2 with consideration taken only of the position of the control point 5 being in agreement with the movement target position 7. If the button 8b is selected, the emphasis on position and posture mode is brought about, wherein consideration is taken of the posture of the robot 5 when the position of the control point 5 agrees with the movement target point 7, in addition to consideration taken for the position of the control point 5 being in agreement with the movement target point 7. Which mode is to be selected depends on the type of operation to be carried out by the robot 2. If the position of the control point 5 is a concern, the emphasis on position mode is selected to facilitate the operation, wherein the teaching work can be speedily carried out. In the case of teaching an operation in which the posture of an end effecter (not shown) attached to the tip end of the robot 2 with respect to the workpiece 6 becomes a concern, for example, teaching a welding or grinding operation, etc., the emphasis on position and posture mode is selected.

The priority is placed on movement of the travelling axis mode is brought about by selecting the button 8c, wherein the quantity of movement of the travelling axis of the robot 2, that is, a movement target of the robot 2 on the travelling track 1 is first determined, and next the quantities of movement of the other axes of the robot 2 are determined. Where this mode is not selected, the robot 2 does not travel on the travelling track 1. Herein, the button 8c is pressed to select the priority is placed on movement of the travelling axis mode.

Next, either one of the buttons 8d, 8e or 8f is selected, and finally the button 12a is pressed. (1) Where the button 8d moving to the minimum is pressed:

When the button 9a is pressed after selecting the button 8d, the robot 2 travels on the travelling track 1 until the distance between the coordinate origin 3 and the movement target point is minimized. That is, as shown in FIG. 2, the robot 2 travels until the robot 2 directly faces the movement target point 7.

Figure 2:
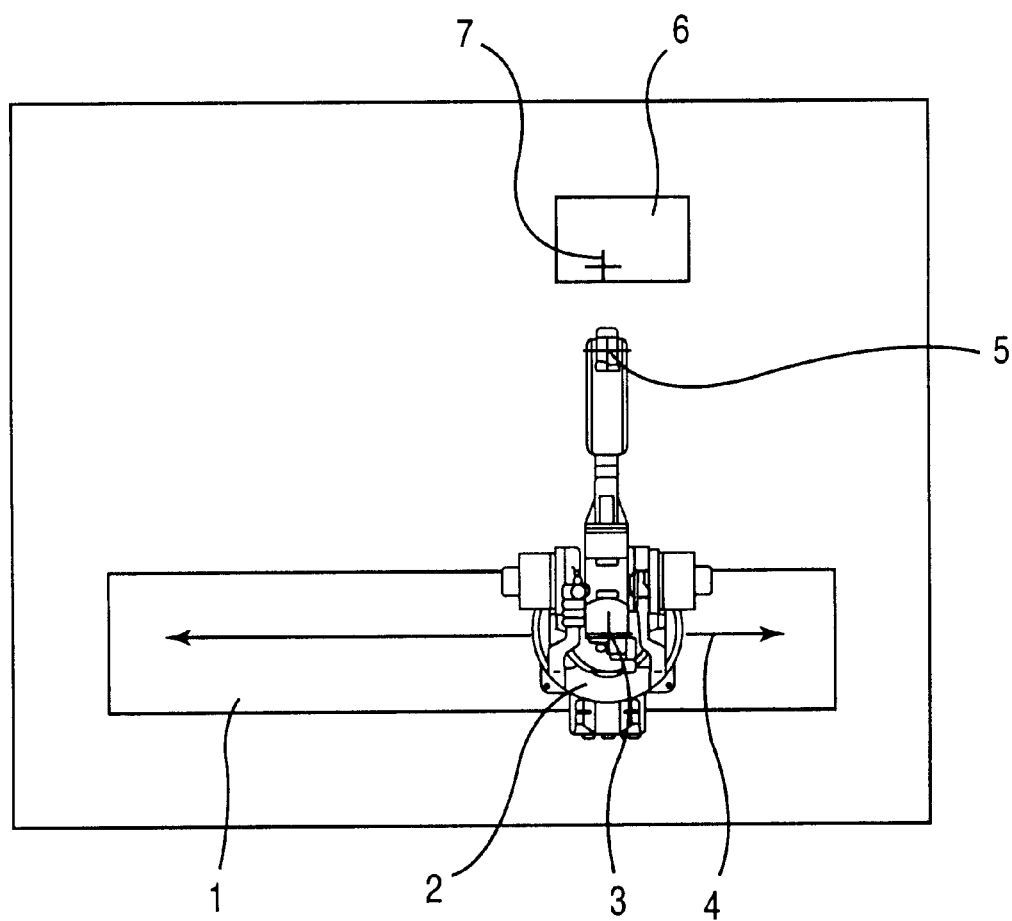
FIG. 2 is a view describing movement to the minimum distance in the embodiment according to the invention.
Figure 3:
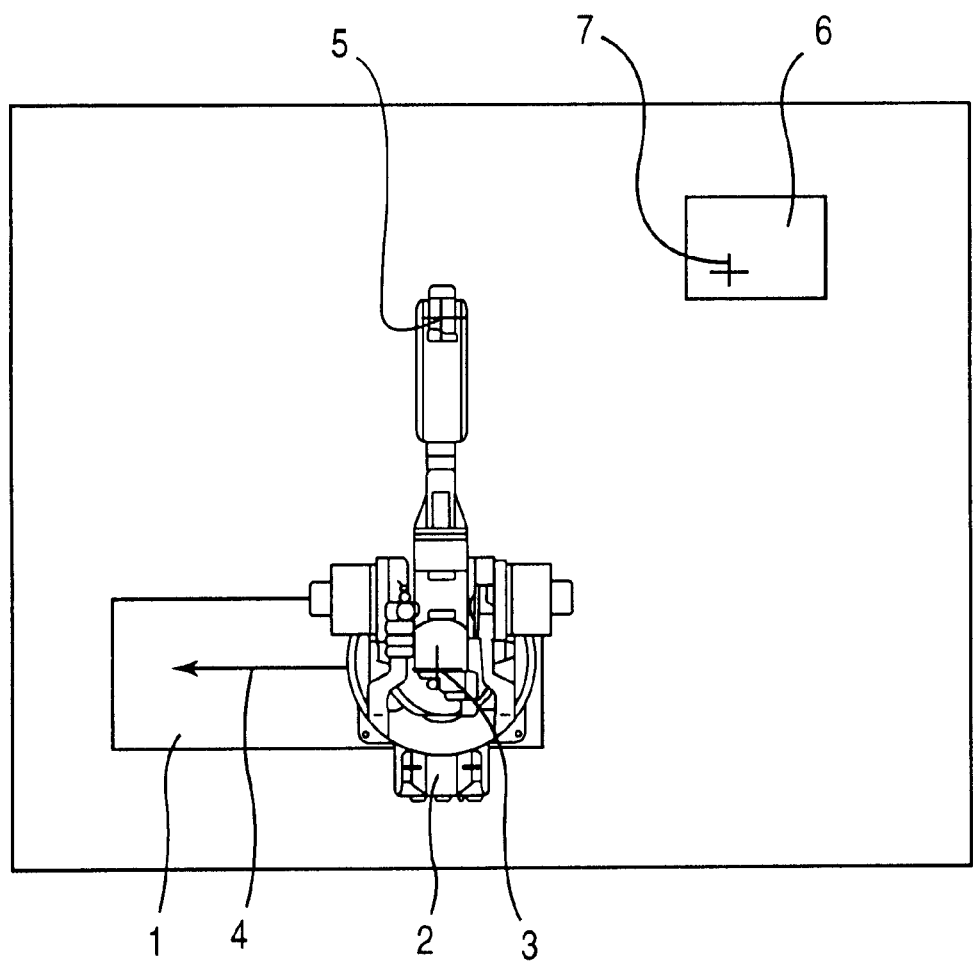
FIG. 3 is a view describing movement to the minimum distance in the embodiment according to the invention.

If such a position as shown in FIG. 2 cannot be obtained due to a limitation in the travelling range of the travelling track 1, the robot 2 travels to the termination end of the travelling stroke 4 as shown in FIG. 3.

Figure 4:
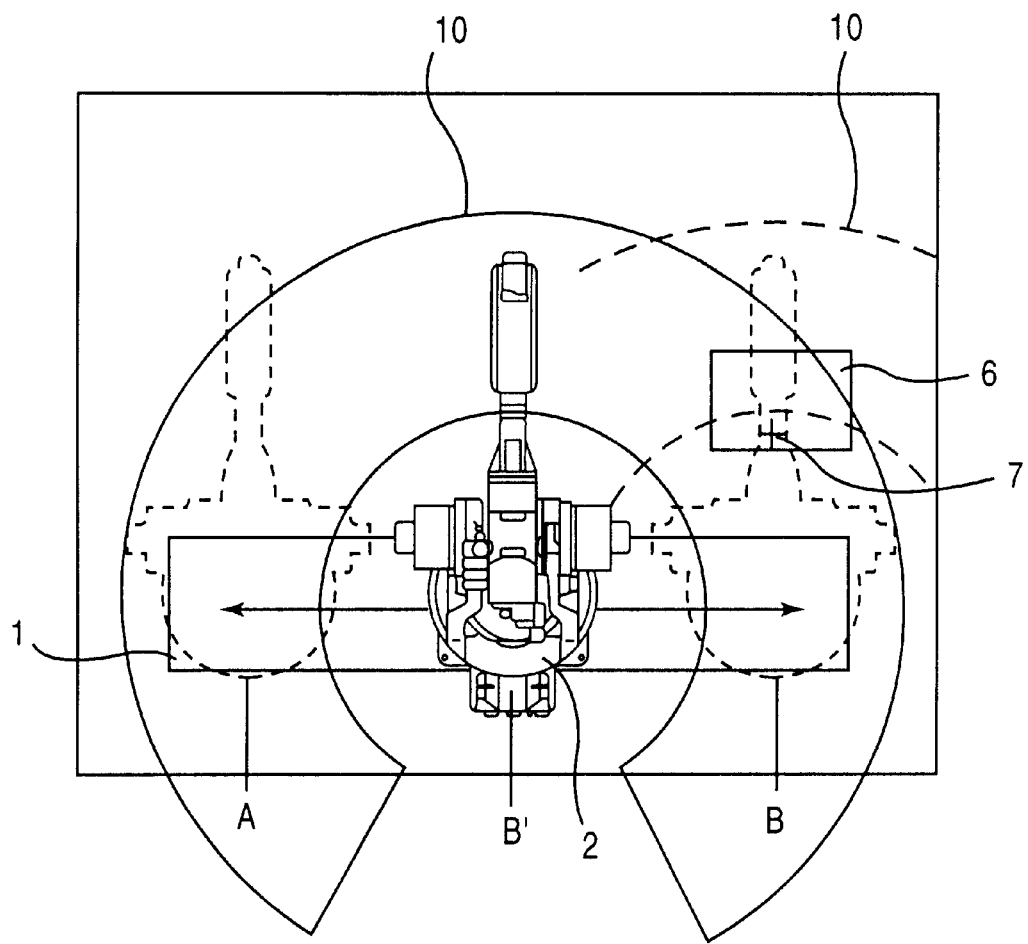
FIG. 4 is a view describing movement to the minimum distance in the embodiment according to the invention.

As the robot 2 is caused to travel to the position where it directly faces the movement target point 7, there is a case where the movement target position 7 comes off from the operation range 10 of the control point 5. For example, as shown in FIG. 4, if the robot 2 is caused to travel from the position A to the position B to cause the distance between the coordinate origin 3 and the movement target position 7 to be minimized, there is a case where the movement target point 7 becomes outside the operation range 10 of the control point 5. In such a case, the robot 2 is returned from the position B to the position A until the movement target point 7 enters the operation range 10. At this time, inside the computer, a trial by which the robot 2 is returned from the position B to the position A by a fixed length is repeated, and it is checked in respective trials whether or not the movement target point 7 is permitted to enter the operation range 10, wherein the position B' at which the movement target point 7 entered the operation range 10 is determined to be a movement target of the robot 2 on the travelling track 1.

Thus, as the movement target of the robot 2 on the travelling track 1, that is, the final position, is determined and is displayed on the display, the operator judges whether or not there is anything inconvenient with respect to the position. If there is nothing inconvenient, the button 9b is pressed, and the above-described movement target is determined as the teaching position.

Further, the operator presses the button 12a and causes the control point 5 to move toward the movement target point 7. At this time, since the movement quantity of the travelling axis is determined, the movement quantities with respect to the remaining three degrees may be determined. Therefore, the quantities of movement may be monistically determined.

Figure 5:
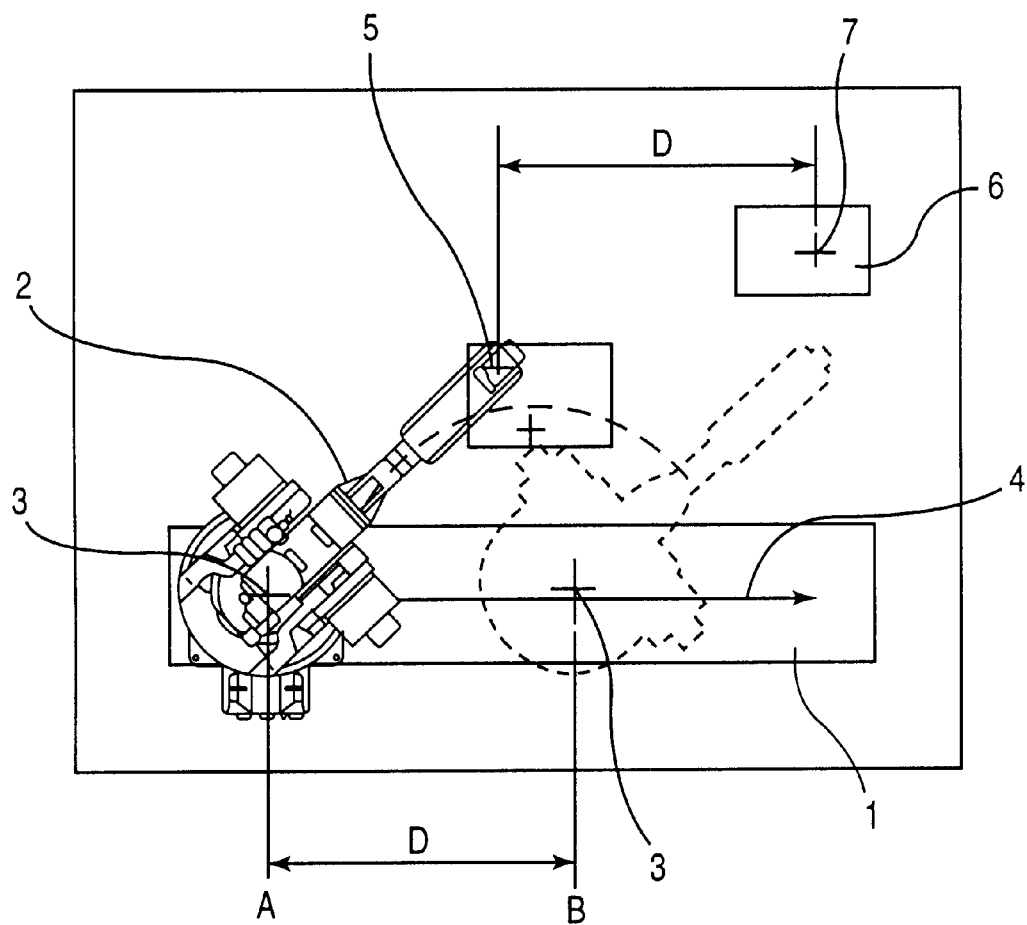
FIG. 5 is a view describing differential movement in the embodiment according to the invention.

(2). Where the button 8e differential movement is pressed:

If the button 9a is pressed after the button 8e is selected, as shown in FIG. 5, inside the computer, a length D along the travelling track 1 corresponding to the distance between the control point 5 and the movement target point 7, in other words, a component parallel to the travelling track 1 of a vector oriented from the control point 5 toward the movement target point 7, is obtained. Next, the robot 5 is caused to travel by the length D toward the movement target point 7.

In a case where the robot cannot travel to the above-described position due to a limitation in the operation range of the travelling track 1, the robot travels to the termination end of the travelling stroke 4 as in the case of movement to the minimum distance.

In addition, in a case where the movement target point 5 comes out from the operation range 10 of the control point 5 at the above-described position, the robot 2 is returned from the position B to the position A until the movement target point 7 enters the operation range 10, as in the case of movement to the minimum distance.

The following process is the same as that in the case of movement to the minimum distance.

Figure 6:
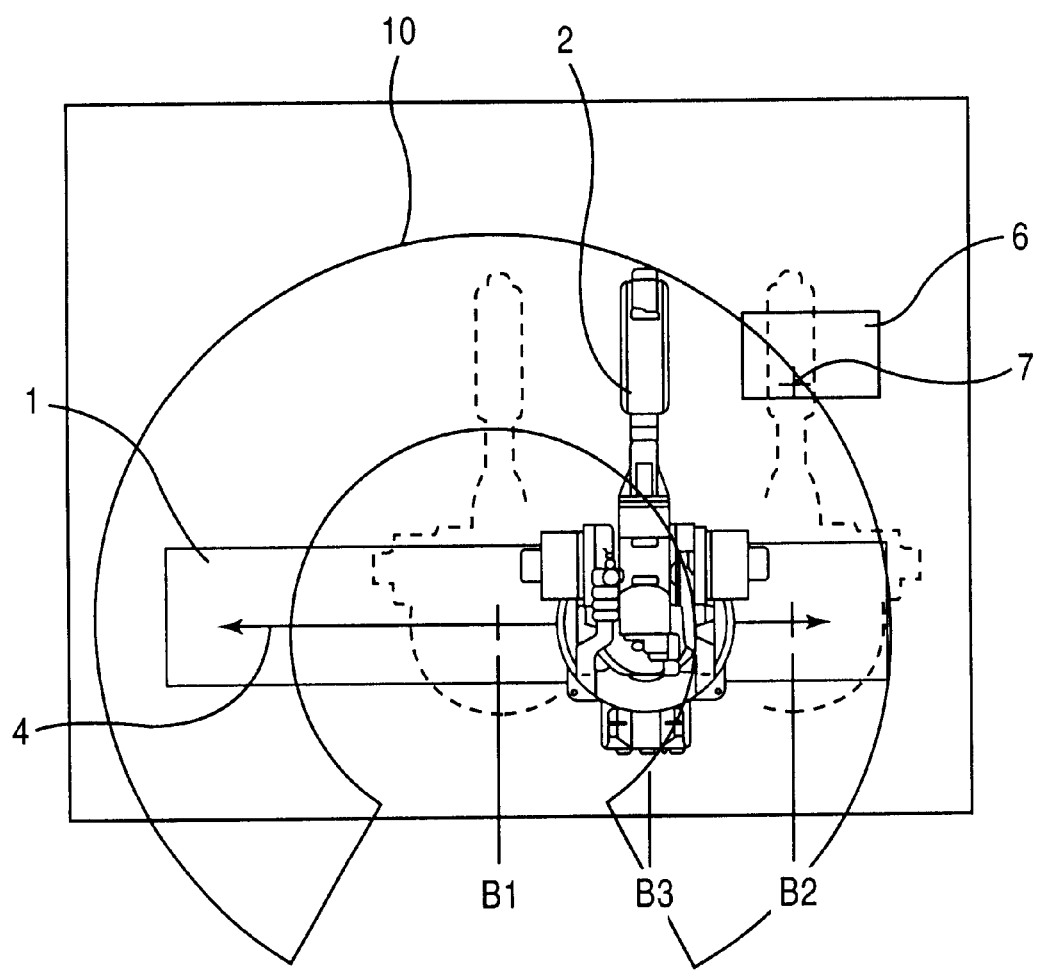
FIG. 6 is a view describing movement to an arbitrary position in the embodiment according to the invention.

(3) Where the button 8f movement to an arbitrary position is selected:

As the button 9a is pressed after selecting the button 8f, as shown in FIG. 6, a trial is repeated inside the computer, in which the robot 2 is caused to travel from the initial position to the movement target point 7 on the travelling track 1 micro distance by micro distance, and the first position B1, at which the movement target point 7 enters inside of the operation range 10 beyond the outside boundary of the operation range 10 is obtained. Next, a target position B2 in the case of the movement to the minimum distance is obtained, wherein the robot 2 is caused to travel to an arbitrary position B3 between the first position B1 and target position B2.

The subsequent process is similar to that of the case of movement to the minimum distance.

As described above, according to the invention, since, in the off-line teaching of a robot with a travelling axis, three types of condition are selected and the target position of the travelling axis can be determined in compliance with the selected conditions, such an effect can be brought about, by which the target position of the travelling axis can be monistically determined even if the degree of freedom, of a robot with a travelling axis is redundant.

In addition, since the target position can be monistically determined by a computer, another effect can be brought about, by which the teaching quality is free from any unevenness even if a difference exists in the skill of operators.

Further, the teaching worktime is free from any unevenness even if a difference exists in the skill of operators, and even if operators are unskilled or have little experience, teaching work can be efficiently carried out in as short a time as by skilled operators. Industrial applicability The present invention is very effective as an off-line teaching method of a robot with a travelling axis, by which the movement quantity of a robot with a travelling axis can be monistically determined.

What is claimed is:

1. A method of teaching a robot with a traveling axis off-line, by which a final position and final posture are determined when a robot with a traveling axis that stops at an arbitrary position on a traveling axis and is able to take an arbitrary posture at said arbitrary position, departing from an arbitrary position and an arbitrary posture, and a control point of said robot with a traveling axis is agreed with a moment target point, wherein the arbitrary position of said traveling axis of said robot with a traveling axis, at which the distance between a coordinate origin of said robot with a traveling axis and said movement target point is minimized, is determined to be said final position.

2. A method of teaching a robot with a traveling axis off-line, by which a final position and final posture are determined when a robot with a traveling axis that stops at an arbitrary position on a traveling axis and is able to take an arbitrary posture at said arbitrary position, departing from an arbitrary position and an arbitrary posture, and a control point of said robot with a traveling axis is agreed with a movement target point, wherein a component parallel to said traveling axis of a vector oriented from said control point toward said movement target point is obtained when said robot with a traveling axis at an initial position, and the position, at which said robot has traveled by said component of said vector from said initial position, is determined to be an initial final position.

3. A method of teaching a robot with a traveling axis off-line, by which the final position and final posture are determined, when a robot with a traveling axis that stops at an arbitrary position on a traveling axis and is able to take an arbitrary posture at said arbitrary position, departing from an arbitrary position and an arbitrary posture, and a control point of said robot with a traveling axis is agreed with a movement target point, wherein a position on the said traveling axis, at which said moment target point exceeds the outer limit of the operation range of the control point of said robot with a traveling axis and enter said operation range when said robot with a traveling axis approaches said moment target point from an initial position on said traveling axis, is taken as a first position, and a position on said traveling axis of said robot with a traveling axis, where the distance between the coordinate origin of said robot with a traveling axis and said moment target point is minimized, is taken as a second position, where and an arbitrary point between said first position and said second position is determined to be the final teaching position of said robot with a traveling axis on said traveling axis.

4. The method of teaching a robot with a travelling axis off-line as set forth in claim 1 wherein said movement target point resides outside the operation range of said control point when said robot with a travelling axis is located at said final position, said robot with a travelling axis is repeatedly moved at an appointed pitch from said final position to said initial position until said movement target point enters the operation range of said control point.

* * * * *